3,741,939
POLYMERIZING CAPROLACTAM
Paul Wittmer, Landau, Guenter Becht, Speyer, and Helmut Doerfel, Ludwigshafen, Germany, assignors to Badische Anilin- & Soda-Fabrik Aktiengesellschaft, Ludwigshafen (Rhine), Rhineland-Pfalz, Germany
No Drawing. Filed Nov. 8, 1968, Ser. No. 774,485
Claims priority, application Germany, Nov. 11, 1967, P 17 20 322.4
Int. Cl. C08g 20/12
U.S. Cl. 260—78 L 7 Claims

ABSTRACT OF THE DISCLOSURE

An improved process for polymerizing caprolactam in the presence of water, polymerization catalysts and/or polymerization regulators at temperatures of from 120° to 320° C. and pressures of more than 2000 atmospheres.

---

This invention relates to an improved process for polymerizing caprolactam in which polymers having very low contents of residual monomers and oligomers are obtained by polymerization at high pressure.

The production of polycaprolactam on a large scale is carried out almost exclusively by what is known as hydrolytic polymerization of caprolactam. In this method caprolactam is heated in the presence of water and water-eliminating substances and in the presence or absence of acids, salts thereof or substances yielding acids as polymerization accelerators, at temperatures above the melting point of caprolactam. However, in the temperature range of from 220° to 280° C., which is of industrial interest, the conversion in hydrolytic polymerization of caprolactam is not complete so that the polymers contain from 6 to 13% of low molecular weight constituents. For example, when the polymerization is carried out at 250° C. 8% of caprolactam and 2% of cyclic oligomers of caprolactam are present in the polycaprolactam obtained.

In most applications for polycaprolactam this content of monomers and cyclic oligomers is very troublesome. Moldings of polycaprolactam which contain monomers adhere to the mold and when stored for long periods caprolactam separates in the form of a white coating. Moreover, moldings, filaments and threads of polycaprolactam containing monomers have much less favorable mechanical properties than those of products devoid of monomers.

Various methods have been proposed for the removal of monomers and cyclic oligomers from polycaprolactam. Usually the polymers containing monomers are purified by repeated extraction with hot water. It is necessary after the extraction to dry the water-saturated polycaprolactam at elevated temperature and in vacuo. Extraction and drying both involve considerable expense.

It is furthermore possible to remove the low molecular weight constituents in polycaprolactam by evaporating them at elevated temperature in vacuo.

Many types of equipment have been proposed for this method in which in principle molten polycaprolactam is always applied as a film to a large heated surface and freed from volatile constituents in vacuo. According to another embodiment of the method the polycaprolactam melt containing monomers is treated in a film evaporator. This method for removing lactam from polycaprolactam in a melt has the disadvantage that the polymer is not distributed uniformly over the heated portion of the apparatus and discharged therefrom. At some places after-condensation of the polycaprolactam takes place and this increases the melting point so that the product becomes solid and is decomposed. Moreover, when delactamized polycaprolactam melts remain for a long period at elevated temperature, monomers reform.

Cationic polymerization of caprolactam in the presence of strong acids, salts thereof or substances which yield acids with the exclusion of water does not proceed with 100% conversion either but results in practically the same equilibrium condition as hydrolytic polymerization.

We have now found that caprolactam can be converted with a high conversion into polycaprolactam in the presence of water, polymerization catalysts and/or polymerization regulators at temperatures of from 120° to 320° C. by carrying out the polymerization at a pressure above 2000 atmospheres.

According to an advantageous embodiment of the process the polymerization is carried out at a pressure of from 3000 to 4000 atmospheres. The polymerization may be carried out at far higher pressures with yet larger conversions but the use of these higher pressures involves uneconomically high expenditure for the necessary equipment.

The high pressure may be maintained throughout the polymerization period. It is particularly advantageous however first to carry out prepolymerization of caprolactam at atmospheric pressure or at the autogenous pressure of water at the polymerization temperature (i.e. at pressures of up to 80 atmospheres) up to a conversion of from example 80 to 92% and then to remove the water if necessary and to carry the polymerization to completion at the high pressures indicated above.

Polymerization of caprolactam is preferably carried out at a temperature which is above the melting point of the polycaprolactam so that polymerization takes place in liquid phase. It is also possible however to carry the polymerization to completion at high pressure below the melting point of the polymer in the plastic or solid condition.

The upper limit of the polymerization temperature is set by the fact that caprolactam decomposes slowly at above 300° C. and rapidly above 320° C.

The process according to this invention may be carried out batchwise or continuously. Conventional reaction accelerators, such as omega-amino acids, for example omega-aminocaproic acid, salts of dicarboxylic acids and diamines such as the salt of adipic acid and hexamethylenediamine, and strong acids such as oxygen acids of phosphorus, halogen hydracids, sulfuric acid, sulfonic acids, dicarboxylic acids and salts of these acids or substances which split off these acids, may be present.

Conventional regulators, such as organic monocarboxylic acids, for example acetic acid, propionic acid, butyric acid, stearic acid, dicarboxylic acids or adipic acid, sebacic acid or diamines such as hexamethylenediamine or octamethylenediamine, may be added to the polymerization mixture before or during the polymerization to regulate the chain length. These polymerization catalysts and regulators are used in amounts of from 0.05 to 2 mol percent, preferably from 0.1 to 0.5 mol percent, with reference to caprolactam.

Polymerization of caprolactam may be carried out in the presence of inert fillers or pigments, such as silicon dioxide, titanium dioxide, glass fibers or asbestos.

Polymers having a content of monomers and oligomers of from 2 to 5.5% are obtained by the process according to this invention; they may be processed into moldings, film, sheeting or fibers for almost all applications without pretreatment.

The invention is illustrated by the following examples in which parts are by weight unless otherwise stated.

EXAMPLE 1

145 parts of caprolactam, 3.3 parts of omega-aminocaproic acid and 1.5 parts of water are heated in a high pressure autoclave lined with alloy steel and provided with an aluminum bushing to 250° to 260° C. (temperature in the heating jacket of the autoclave: 270° to 280° C.) and polymerized at this temperature and at atmospheric pressure for six hours in a stream of nitrogen. Then heating is continued at the same temperature and at a pressure of from 3050 to 3600 atmospheres gauge for four hours; the contents of the autoclave are then cooled under the said pressure until the temperature in the heating jacket of the autoclave is 100° C. and then allowed to coool to room temperature without forcing in more nitrogen.

Colorless polycaprolactam is obtained having a K value of 89 and containing 2.4% of constituents which are capable of being extracted with methanol. Gas chromatographic analysis of the extract shows that 50% of caprolactam and 50% of a mixture of cyclic oligomers of caprolactam are contained therein. The polycaprolactam contains 32.3 gram equivalents per metric ton of terminal carboxyl groups and 32.5 gram equivalents per metric ton of terminal amino groups.

EXAMPLE 2

Under the conditions of Example 1 a polycondensate having a K value of 77 and a residual extract of 5.8% is obtained by aftercondensation of the polycaprolactam under a nitrogen pressure of only 1600 to 2000 atmospheres. The extract consists of 69% of caprolactam and 31% of a mixture of cyclic oligomers of caprolactam.

EXAMPLE 3

When the procedure of Example 1 is followed but the nitrogen pressure in the aftercondensation phase is 100 to 1100 atmospheres gauge, polycaprolactam is obtained which has a K value of 76 and a residual extract content of 8.1%.

EXAMPLE 4

Under the conditions of Example 1 but with the additional use of 0.1% of phosphorous acid, polycaprolactam having a K value of 95 and an extract content of 2.7% is obtained at a nitrogen pressure of from 2200 to 2600 atmospheres gauge in the aftercondensation. The extract consists of 57% of caprolactam and 43% of a mixture of cyclic oligomers of caprolactam.

EXAMPLE 5

The procedure of Example 4 is followed but the aftercondensation pressure is 2000 atmospheres gauge. The K value of the polycaprolactam is 92 and the extract content is 7.6%.

EXAMPLE 6

Under the conditions of Example 4 polycaprolactam having a K value of 88 and an extract content of 8.4 to 9.1% is obtained at an aftercondensation pressure of 1000 atmospheres gauge.

EXAMPLE 7

Polycaprolactam having a K value of 71, an extract content of 9% and a water content of 0.3% is heated in a high-pressure autoclave under an initial nitrogen pressure of 100 atmospheres gauge until the temperature in the heating jacket of the autoclave has reached 295° C. The nitrogen pressure is then increased to 2700 to 3600 atmospheres gauge; these conditions are maintained for four hours and then the whole is cooled to 100° C. under a pressure of 3000 atmospheres gauge. Polycaprolactam treated in this way has a K value of 56 and contains 4.4% of residual extract.

EXAMPLE 8

Polycaprolactam having a K value of 62 and an extract content of 3.9% is obtained under the conditions of Example 7 in the pressure of 0.1% of phosphorous acid with reference to caprolactam.

EXAMPLE 9

100 atmospheres gauge of nitrogen is forced at room temperature into a high-pressure autoclave containing 149 parts of caprolactam and 0.45 part of omega-aminocaproic acid. The whole is heated until a temperature of 285° C. has been reached in the heating jacket of the autoclave; an internal pressure of 2020 atmospheres gauge is thus set up. More nitrogen is forced in until a pressure of 3600 atmospheres gauge has been set up, and these conditions are maintained for another four hours. The whole is cooled under 3000 to 3600 atmospheres gauge to 100° C. Polycaprolactam having a K value of 80 and an extract content of 5.3% is obtained. According to gas chromatographic analysis the residual extract consists of about equal parts of caprolactam and a mixture of cyclic oligomers of caprolactam.

EXAMPLE 10

Caprolactam is converted under the conditions of Example 9 with an addition of 3.3 parts of omega-aminocaproic acid and 0.3 part of 50% phosphorous acid into a polycondensate having a K value of 80 and an extract content of 5.1%.

EXAMPLE 11

97.7 parts of caprolactam, 2.2 parts of omega-aminocaproic acid and 0.1 part of phosphorous acid are heated up in an autoclave in the course of five and a half hours under a nitrogen pressure of 2070 atmospheres to a temperature of 254° C., kept for four hours at 254° to 260° C. at a pressure of 2850 to 3600 atmospheres and then cooled under a pressure of 3600 atmospheres.

Colorless polycaprolactam is obtained having a K value of 83 and containing 5.1% of constituents extractable with methanol.

When polycondensation is carried out under the same conditions but at a pressure lower than 100 atmospheres, an end product is obtained having an extract content of 11%.

We claim:

1. In a process for the hydrolytic or cationic polymerization of caprolactam into polycaprolactam at temperatures of about 120° C. to 320° C. in the presence of at least one catalytic substance selected from the group consisting of water, acids and salts of acids, the improvement which comprises carrying out said polymerization at a pressure of more than 2000 atmospheres.

2. A process as claimed in claim 1 wherein said polymerization pressure is from 3000 to 4000 atmospheres.

3. A process as claimed in claim 1 wherein said polymerization is carried out at a temperature above the melting point of the polycaprolactam up to about 300° C.

4. A process as claimed in claim 1 wherein said polymerization is carried out in the presence of a chain length regulator in an amount of about 0.05 to 2 mol percent with reference to caprolactam.

5. A process as claimed in claim 1 wherein said polymerization is carried out in a first stage at a pressure of up to 80 atmospheres and is then completed in a second stage at a pressure of more than 2000 atmospheres.

6. A process as claimed in claim 5 wherein the polymerization pressure in the second stage is from 3000 to 4000 atmospheres.

7. A process as claimed in claim 5 wherein the polymerization in both stages is carried out at a temperature above the melting point of the polycaprolactam up to about 300° C.

References Cited

UNITED STATES PATENTS

| | | | |
|---|---|---|---|
| 2,241,321 | 5/1941 | Schlack | 260—78 L X |
| 2,241,322 | 5/1941 | Hanford | 260—78 |
| 2,907,755 | 10/1959 | Lautenschlager et al. | 260—78 |

OTHER REFERENCES

A.P.C. application of Schlack, Ser. No. 370,142, published June 22, 1943.

WILLIAM H. SHORT, Primary Examiner

L. M. PHYNES, Assistant Examiner